United States Patent
Kauschke et al.

(10) Patent No.: US 7,161,963 B2
(45) Date of Patent: Jan. 9, 2007

(54) FRAME MULTIPLEXER

(75) Inventors: Michael Kauschke, Braunschweig (DE); Michael Meier, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 966 days.

(21) Appl. No.: 10/108,295

(22) Filed: Mar. 25, 2002

(65) Prior Publication Data

US 2003/0179781 A1    Sep. 25, 2003

(51) Int. Cl.
*H04J 3/06*    (2006.01)

(52) U.S. Cl. .................. 370/503; 370/516; 370/517

(58) Field of Classification Search ........ 370/350, 370/442, 535, 537, 503, 506, 507, 508, 509, 370/510, 512, 516, 360, 387
See application file for complete search history.

(56) References Cited

U.S. PATENT DOCUMENTS

| 4,641,327 A | * | 2/1987 | Wei | .................. 375/365 |
| 6,515,962 B1 | * | 2/2003 | Sawey et al. | ............ 370/228 |

* cited by examiner

*Primary Examiner*—Ajit Patel
(74) *Attorney, Agent, or Firm*—Fish & Richardson P.C.

(57) ABSTRACT

A frame-interleaving system may transmit the same data in two data streams. Frames may become fragmented switching between two data streams. The reliability of a frame-interleaving system may be improved by aligning data streams that carry the same data so that the corresponding frames in the data streams are synchronized before the data streams are switched.

33 Claims, 4 Drawing Sheets

FRAME MULTIPLEXER

TECHNICAL FIELD

The following description relates to a digital communication system that includes a high-speed transport network.

BACKGROUND

Digital communication systems may use frames to transmit data through a network of communication systems to a destination. Ideally, frames of data are transmitted without error. In some networks, the reliability of framed and transmitted data may be increased by transmitting identical data in two data streams. If one data stream degrades or otherwise fails, the spare data stream may be used. When a switch occurs from one data stream to another data stream, some data may be lost.

DESCRIPTION OF DRAWINGS

Like reference symbols in the various drawings indicate like elements.

DETAILED DESCRIPTION

Digital communication systems may employ frame-interleaving systems as part of the physical layer of a networking service. Examples of such systems include SONET ("Synchronous Optical Network"), SDH ("Synchronous Digital Hierarchy"), and OTN ("Optical Transport Network") systems. A frame-interleaving system transmits groups of bits called frames over a link toward a destination. A frame is forwarded to a destination through a series of network nodes.

Figure 1:
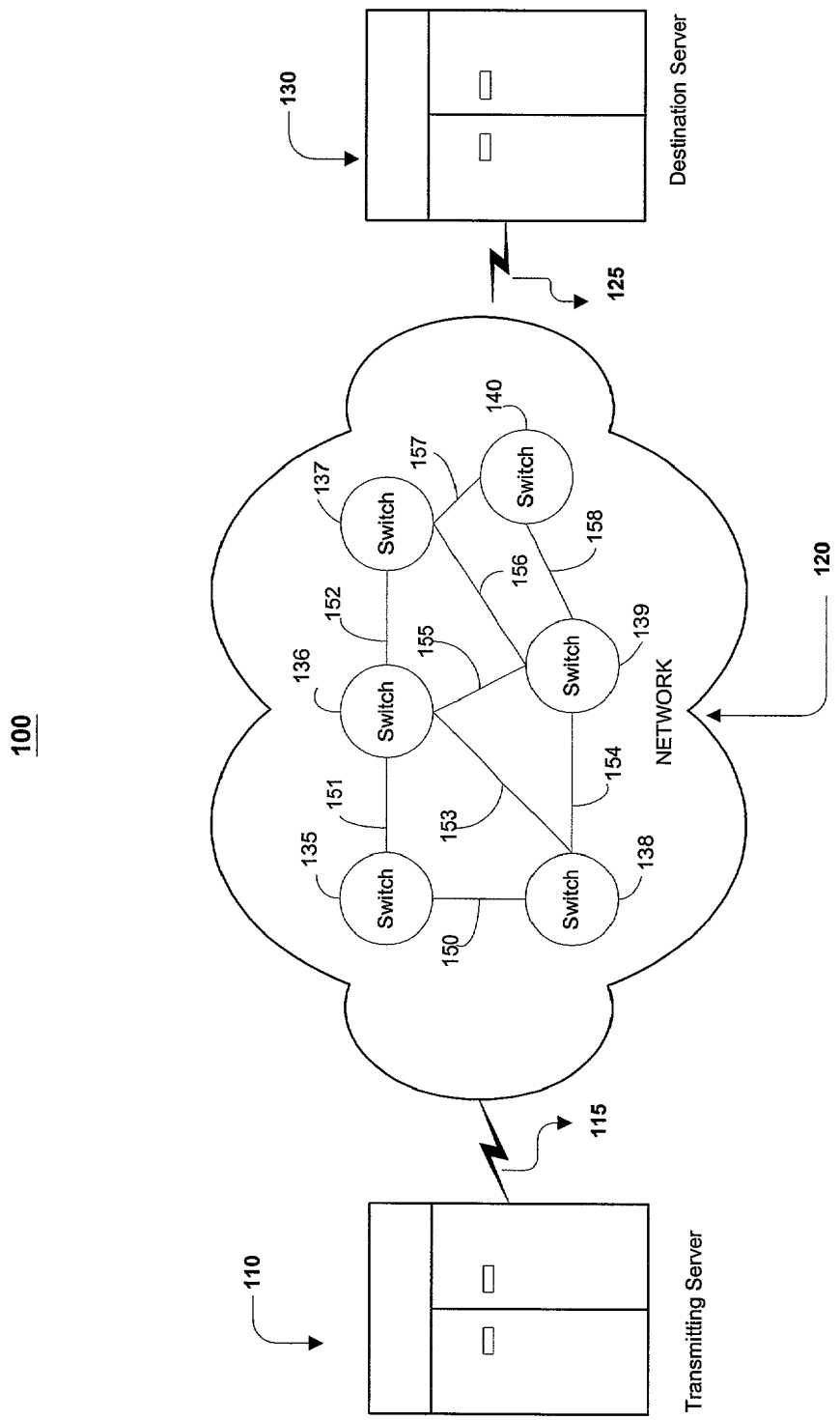
FIG. 1 is a diagram of a frame relay network.

FIG. 1 shows a typical frame-interleaving system 100 that includes a transmitting server 110 connected through a communication pathway 115 to a frame-interleaving network 120 that is connected through a communication pathway 125 to a destination server 130. The transmitting server 110 sends data encoded into a signal through the frame-interleaving network 120 to the destination server 130. The signal is divided into a series of frames. These frames typically pass through a series of network nodes or switches 135–140 that are connected by communication pathways 150–158. For brevity only a small number of switches and communication pathways are shown in FIG. 1.

The reliability of a frame-interleaving system may be improved by transmitting the same data in two data streams. For example, the same data may be encoded into a working signal (which may be called a working channel) and a spare signal (which may be referred to as a spare channel, protection signal, or protection channel). If the working signal degrades or otherwise fails, the spare signal may be used in the place of the working signal.

A multiplexer switch may be used to select between the working signal and the spare signal. For example, the multiplexer switch may be used to switch signals by sending out only a spare signal of received signals. When a switch occurs from the working signal to the spare signal and the signals are not phase aligned, data in the stream may "jump" as data are lost or repeated. The two signals are called aligned when the start of the corresponding frames in both signals pass a particular location at the same, or nearly the same, time. For example, a particular frame in the spare signal may enter the multiplexer switch before the corresponding frame in the working signal enters the multiplexer switch. When the multiplexer switch switches from the working channel to the spare signal, a portion of a frame (or some number of frames) may be lost because the spare signal that is sent out is not at the same point in the data stream as the working signal would have been.

Additionally, a latency may develop, and may escalate, as one or more subsequent network nodes detect the phase shift and attempt to correct it by re-synchronizing to the shifted frame phase. The latency may exceed the maximum amount of time permitted for a network node to handle a failure, which may cause the signal to fail. The reliability of a frame-interleaving system may be improved by aligning data streams that carry the same data so that the corresponding frames in the data streams are synchronized before switching the data streams.

Figure 2:
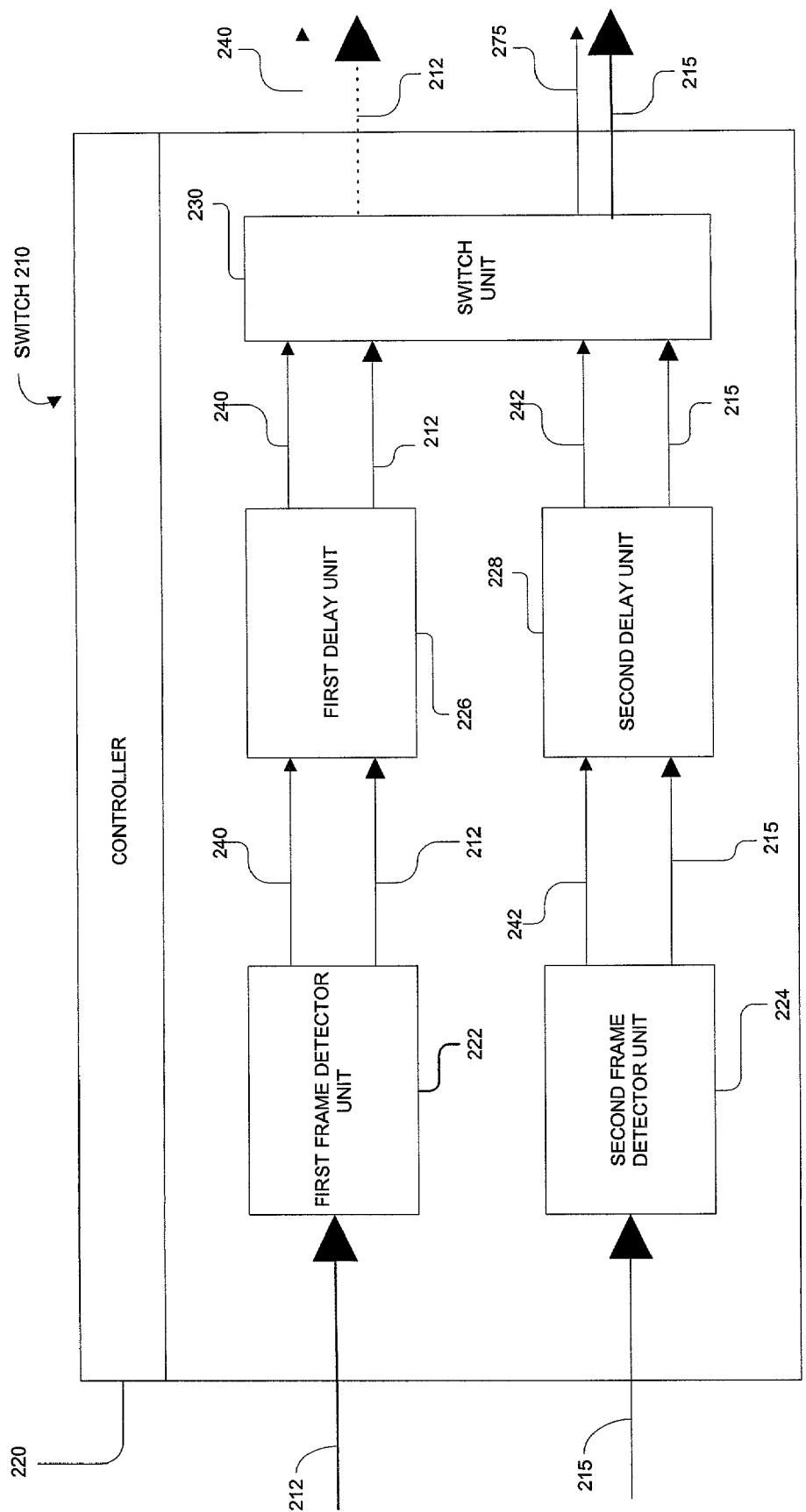
FIG. 2 is a block diagram of a switch that aligns two data streams prior to performing a switching function.

As shown in FIG. 2, a switch 210 may be used to align a first signal 212 and a second signal 215 that are carrying the same data. The switch 210 includes a controller 220, two frame detectors 222, 224, two delay units 226, 228, and a switch unit 230. The first frame detector 222 receives a first signal 212 and is associated with the first delay unit 226, and the second frame detector 224 receives a second signal 215 and is associated with the second delay unit 228. The two frame detectors operate in the same manner, as do the two delay units.

A first frame detector unit 222 searches the first received signal 212 for the start of a frame, which may be identified by a frame alignment word or other indicator. When the first frame detector unit 222 determines the start of a frame, the frame detector unit generates a frame pulse 240. At the same time, the second frame detector unit 224 searches the received signal 215 and generates a second frame pulse 242 when the start of a frame is identified.

The controller 220 detects the frame pulses 240, 242. The controller then determines the amount, if any, of the time difference that exists between the two signals by measuring the time difference, if any, between the two frame pulses 240, 242.

If a time difference is found, the controller 220 delays the faster of the two signals 212, 215 by the amount of the time difference between the two frame pulses 240, 242 by using the delay unit that is associated with the faster signal.

Each delay unit 226, 228 receives and temporarily stores its respective signal 212, 215 and additionally may adjust the phase of the received signal as directed by the controller. The delay unit, for example, may be a FIFO ("first-in, first-out") or an elastic store that may adjust the data stream by a programmable amount of delay as indicated by the controller. In this manner, the signals 212, 215 are aligned (or synchronized) before the switch unit 230 receives them.

The switch unit 230 receives the two signals 212, 215 that have been synchronized and the two frame pulses 240, 242. The switch unit 230 is a multiplexer switch which sends only one signal 215 and a frame pulse 242 associated with the signal 215. This accomplishes switching from the working signal 212 to the spare signal 215 as the spare signal is the only signal sent to the next network node.

Alternatively, the switch unit 230 may be a cross-connector switch that accepts 212, 215 and sends two signals 212, 215. The cross-connector switch may also send the frame pulses 240, 242 associated with each signal. The cross-connector switch may mix frames from both signals so that the processed signals 212, 215 sent out from the switch have been changed from the received signals. For instance, a cross-connection switch may be used to replace every tenth frame in the working signal with the corresponding frame in the spare signal. This may result in strengthening the working signal. It may also serve for information interchange between the two signals.

Implementations may vary the position of the controller within the switch. For example, the controller may be placed between the frame detector units and the delay units, or the controller may be placed between the delay units and the switch unit.

An alternative implementation includes only one delay unit. Such an implementation may be particularly appropriate when one of the signals is known to lag behind.

Figure 3:
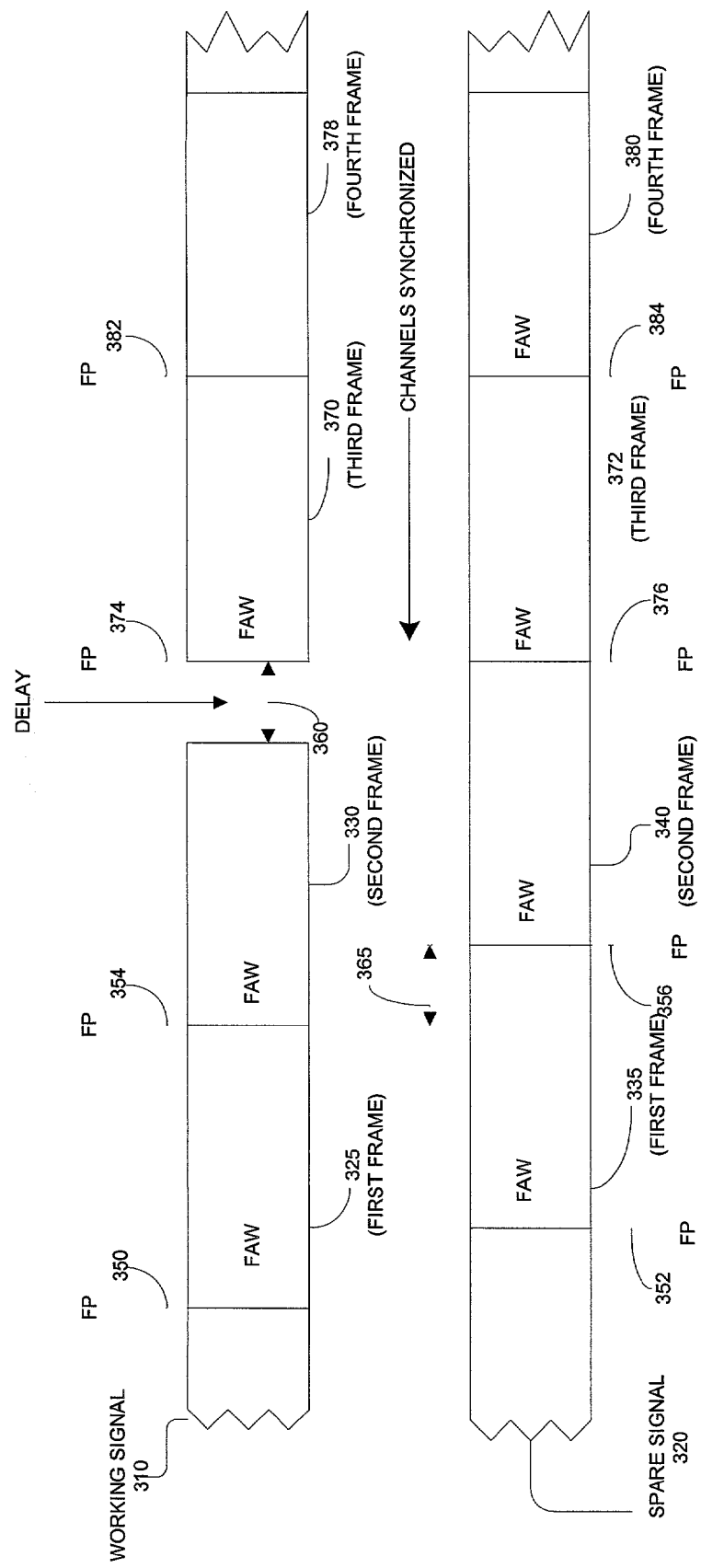
FIG. 3 is a timing diagram of the alignment of two data streams.

FIG. 3 illustrates a portion of two signals that carry the same data streams in a frame-interleaving network switch. The implementation of the switch that produces the signals of FIG. 3 includes a controller, two frame detector units, two elastic stores, and a multiplexer switch. The multiplexer switch receives a working signal and a spare signal and sends out the spare signal.

The working signal 310 and the spare signal 320 contain the same four frames. The signals are not aligned as they enter the multiplexer switch. A first frame 325 and the second frame 330 in the working signal 310 arrive at the switch before the corresponding first frame 335 and second frame 340 in the spare signal 320. The working signal may be referred to as the "earlier" signal because the frames in the working signal arrive at the multiplexer switch before the corresponding frames in the spare signal.

The frame pulses generated by the frame detector units when the first frame is identified occur at different time periods. The frame pulse 350 is generated when the frame detector associated with the working signal 310 identifies the start of the first frame 325 in the working signal 310. The frame pulse 352 is generated by when the frame detector associated with the spare signal 320 identifies the start of the first frame 335 in the spare signal 320. The frame pulse 350 in the working signal occurs before the corresponding frame pulse 352 in the spare signal. In the same manner, the frame pulse 354 associated with the second frame in the working signal 310 occurs before the frame pulse 356 associated with the second frame in the spare signal 320.

The controller directs the elastic store associated with the working signal to delay the phase of that signal by an amount equal to the difference between the frame pulse 354 associated with the second frame 330 in the working signal 310 and the frame pulse 356 associated with the second frame 340 in the spare signal 320. The length of the delay 360 in the working signal is equal to the amount of time 365 between the frame pulses 354, 356 associated with the second frames 330, 340 of the working signal and the spare signal.

In this manner, the two signals are synchronized beginning with the third frame. The third frame 370 in the working signal 310 is aligned with the third frame 372 in the spare signal 320 as the synchronized frame pulses 374, 376 indicate. The signals remain synchronized for some number of subsequent frames as indicated by the synchronization that occurs in the fourth frame. In particular, the fourth frame 378 in the working signal 310 is aligned with the fourth frame 380 in the spare signal 320 as the synchronized frame pulses 382, 384 indicate.

When the multiplexer switch changes the working signal to the synchronized spare signal, the data stream "jump" may be eliminated because data are not lost or repeated. The point in the data stream at which the spare signal is sent out of the multiplexer switch is the same point as the working signal would have been. Because the signal does not contain data errors for subsequent network nodes to detect, latency does not develop as the signal is processed by subsequent network nodes.

Figure 4:
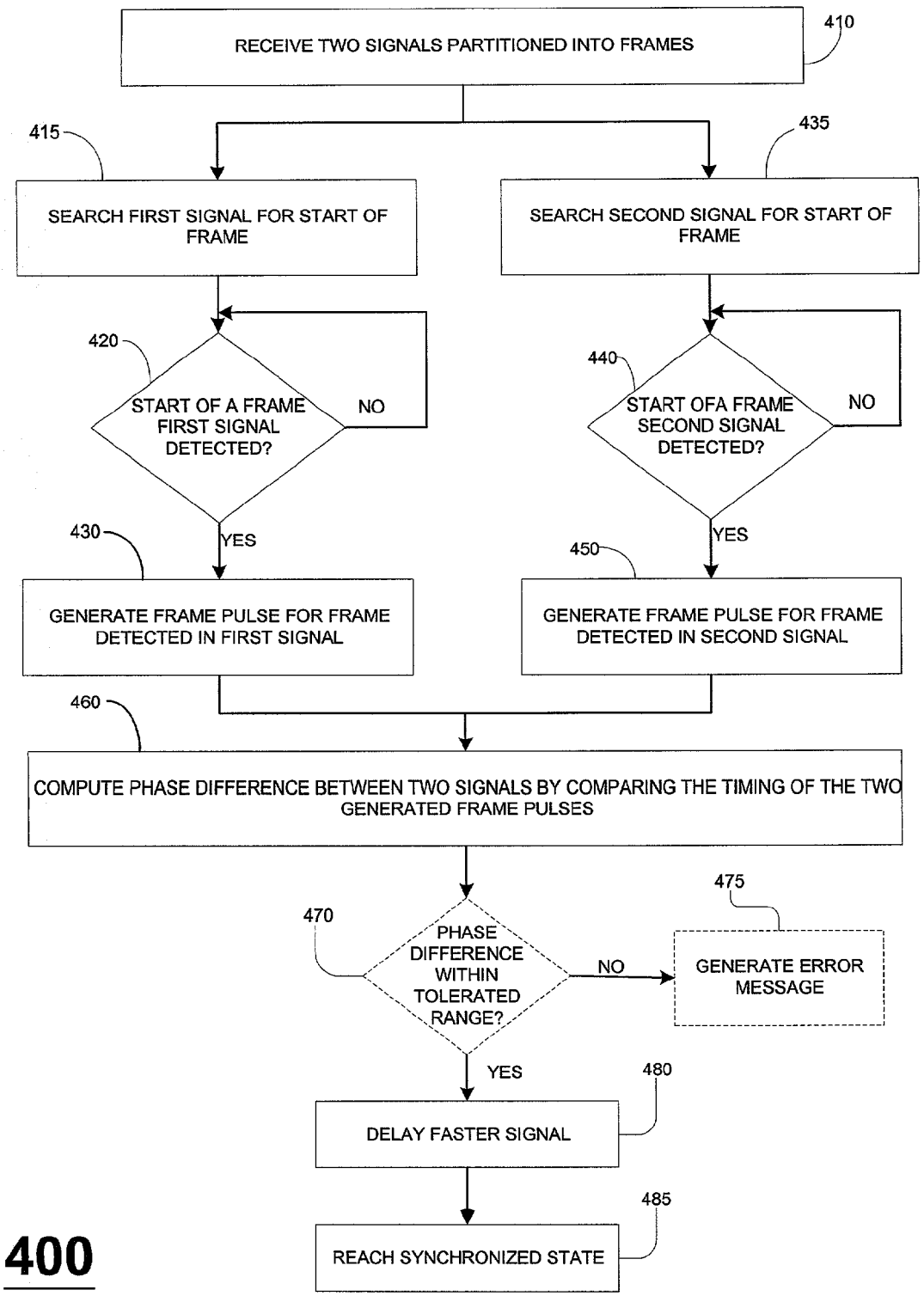
FIG. 4 is a flow chart of a process for aligning data streams.

Referring to FIG. 4, a process 400 begins when a multiplexer switch receives two signals that each have been partitioned into frames (410). The multiplexer switch searches the first signal for the start of a frame (415). When the start of a frame in the first signal is identified (420), the multiplexer switch generates a frame pulse that is associated with the start of a frame in the first signal (430).

The multiplexer switch processes the second signal in the same manner. In particular, the multiplexer switch searches the second signal for the start of a frame (435), and, when the start of a frame in the second signal is identified (440), the multiplexer switch generates a frame pulse that is associated with the start of a frame in the second signal (450).

The multiplexer switch computes the phase difference between the two signals (460). This is accomplished by comparing the timing of the two generated frame pulses.

The multiplexer switch may determine whether the phase difference between the two signals is within a tolerated range that is, within the capability of the process to correct (470). The tolerated range, for example, may correspond to the range of delay which may be attained by a particular elastic store used in the implementation. If the phase difference is greater than that which the multiplexer switch is capable of correcting, the multiplexer switch generates an error message (475). If the multiplexer switch is capable of correcting the delay, the process proceeds.

The multiplexer switch delays the faster signal by adjusting the phase of the frame according to the amount of time between the two frame pulses (480) and the synchronized state (485) is reached.

The multiplexer switch may perform the switch by sending only one of the two received signals out of the multiplexer switch. Alternatively, the switch in process 400 may be a cross-connector switch that mixes frames from both signals.

Alternatively, the multiplexer switch may not check whether the phase difference between the two signals is within a tolerated range (470) and may proceed to correct the phase difference without determining whether the multiplexer switch is capable of synchronizing the signals.

The advantages of synchronizing two data streams before performing a switch is not limited to the implementations described or to a particular frame-interleaving protocol, such as SONET, SDH, or OTN.

Implementations may include a method or process, an apparatus or system, or computer software on a computer medium. Further implementations are within the scope of the following claims.

What is claimed is:

1. A method for synchronizing data streams at a switch, the method comprising:
   receiving a first particular frame in a first series of frames in a first delay unit;
   receiving a second particular frame in a second series of frames in a second delay unit;
   determining a phase difference between the first particular frame and the second particular frame;

generating a signal indicating that one of the first particular frame and the second particular frame is to be delayed;

adjusting the phase of one of the first particular frame at the first delay unit and the second particular frame at the second delay unit by delaying one of the first particular frame and the second particular frame to align the first particular frame with the second particular frame; and switching from the first particular frame to the second particular frame so that a receiver previously receiving the first particular frame from the switch instead receives the second particular frame from the switch.

2. The method of claim 1 further comprising identifying the start of the first particular frame and the start of the second particular frame.

3. The method of claim 2 further comprising comparing the start of the first particular frame with the start of the second particular frame.

4. The method of claim 1 wherein:
the switch comprises a first frame detector and a second frame detector; and
the method further comprises
detecting the first particular frame in the first series of frames with the first frame detector, and
detecting the second particular frame in the second series of frames with the second frame detector.

5. The method of claim 4 wherein the switch comprises a multiplexer switch.

6. The method of claim 4 wherein:
the switch comprises a cross-connected switch; and
the method further comprises switching the second series of frames with the first series of frames so that a recipient previously receiving the second series of frames from the switch instead receives the first series of frames from the switch.

7. The method of claim 3 wherein comparing the start of the first particular frame in the first series of frames with the start of the second particular frame in the second series of frames further comprises:
generating a frame pulse when the start of a frame is detected; and
determining a time difference between a first frame pulse generated when the start of the first particular frame is detected and a second frame pulse generated when the start of the second particular frame is detected.

8. The method of claim 7 wherein:
the method further comprises determining whether the switch is able to correct the time difference; and
adjusting a phase of one of the first and second particular frames comprises adjusting a phase of one of the first and second particular frames only when the switch is able to correct the time difference.

9. The method of claim 1 wherein adjusting a phase of one of the first and second particular frames comprises adjusting a phase of the first particular frame and a phase of the second particular frame.

10. An apparatus for synchronizing data streams, the apparatus including a switch comprising:
a first frame detector to identify a start of a first particular frame in a first series of received frames;
a second frame detector to identify the start of a second particular frame in a second series of received frames;
a controller to compare the start of the first particular frame in the first series of frames with the start of the second particular frame in the second series of frames;

a delay unit to adjust a phase of one of the first and second particular frame to align the first particular frame with the second particular frame; and
a switch to switch the first particular frame with the second particular frame so that a receiver previously receiving the first particular frame from the switch instead receives the second particular frame from the switch.

11. The apparatus of claim 10 further comprising:
a second delay unit configured to adjust a phase of one of the first and second particular frame to align the first particular frame with the second particular frame.

12. The apparatus of claim 11 wherein adjusting a phase of one of the first and second particular frame comprises delaying one of the first and second particular frame.

13. The apparatus of claim 10 wherein the switch unit comprises a multiplexer switch unit.

14. The apparatus of claim 10 wherein the switch unit comprises a cross-connected switch configured to switch the second series of frames with the first series of frames so that a recipient previously receiving the second series of frames from the switch instead receives the first series of frames from the switch.

15. The apparatus of claim 11 wherein:
the first frame detector is further configured to generate a first frame pulse when the start of the first particular frame is detected;
the second frame detector is further configured to generate a second frame pulse when the start of the second particular frame is detected; and
the controller is configured to determine a time difference between the first frame pulse and the second frame pulse.

16. The apparatus of claim 11 wherein:
the controller is further configured to determine whether the first delay unit is able to correct the time difference; and
the first delay unit only adjusts a phase of the first series of frames when the first delay unit is able to correct the time difference.

17. The apparatus of claim 11 wherein:
the controller is further configured to determine whether the second delay unit is able to correct the time difference; and
the second delay unit only adjusts a phase of the second series of frames when the second delay unit is able to correct the time difference.

18. A system for synchronizing data streams, the system comprising:
a switch including a first frame detector and a second frame detector to identify a start of a first particular frame and a second particular frame, a first delay unit and a second delay unit to adjust a phase of one of the first and second particular frames to align the first particular frame with the second particular frame to permit the switch to switch between the first particular frame and the second particular frame so that a receiver previously receiving the first particular frame from the switch instead receives the second particular frame from the switch,
first and second incoming transmission channels linked to the switch, and
an outgoing transmission channel linked to the switch.

19. The system of claim 18, wherein the switch delays one of the first and second particular frames.

20. The system of claim 18 wherein:
the switch is to generate a frame pulse when the start of a frame is detected and to determine a time difference between a first frame pulse generated when the start of the first particular frame is detected and a second frame pulse generated when the start of the second particular frame is detected.

21. A computer readable medium having embodied thereon a computer program configured to cause a data processing device to synchronize data streams, the computer program comprising code segments to cause the data processing device to:
determine a timing of receipt of a first particular frame in a first series of frames and a second particular frame in a second series of frames;
generate a signal indicating that the first particular frame is to be delayed at a first delay unit when the first particular frame is faster than the second particular frame or that the second particular frame is to be delayed at a second delay unit when the second particular frame is faster than the first particular frame to thereby delay one of the first particular frame and the second particular frame relative to the other and align the first particular frame with the second particular frame; and
cause a switch from the first particular frame to the second particular frame so that a receiver previously receiving the first particular frame instead receives the second particular frame.

22. The medium of claim 21 further comprising code segments to cause the data processing device to:
identify the start of the first particular frame in the first received series of frames and the start of the second particular frame in a second received series of frames; and
compare the start of the first particular frame in the first series of frames with the start of the second particular frame in the second series of frames.

23. The medium of claim 21 wherein the code segments cause the data processing device to cause the switch at a multiplexer switch.

24. The medium of claim 21, wherein the code segments cause the data processing device to cause the switch at a cross-connected switch.

25. The medium of claim 21 further comprising a code segment to cause the data processing device to:
generate a frame pulse when the start of a frame is detected; and
determine a time difference between a first frame pulse generated when the start of the first particular frame in the first series of frames is detected and a second frame pulse generated when the start of the second particular frame in the second series of frames is detected.

26. The medium of claim 21 further comprising instructions to cause the data processing device to determine whether a switch is able to correct the time difference and to generate the signal only when the switch is able to correct the time difference.

27. The medium of claim 21 wherein instructions cause the data processing device to generate the signal indicating that the first particular frame and the second particular frame are to be delayed.

28. A method for synchronizing data streams at a switch, the method comprising:
identifying the start of a first particular frame in a first series of frames and the start of a second particular frame in a second series of frames;
comparing the start of the first particular frame with the start of the second particular frame;
adjusting a phase of one of the first particular frame and the second particular frame to align the first particular frame with the second particular frame; and
switching from the first particular frame to the second particular frame so that a receiver previously receiving the first particular frame from the switch instead receives the second particular frame from the switch.

29. A method for synchronizing data streams at a switch comprising a first frame detector and a second frame detector, the method comprising:
detecting a first particular frame in a first series of frames with the first frame detector;
detecting a second particular frame in a second series of frames with the second frame detector;
adjusting a phase of one of the first particular frame and the second particular frame to align the first particular frame with the second particular frame; and
switching from the first particular frame to the second particular frame so that a receiver previously receiving the first particular frame from the switch instead receives the second particular frame from the switch.

30. The method of claim 29 wherein the switch comprises a multiplexer switch.

31. The method of claim 29 wherein:
the switch comprises a cross-connected switch; and
the method further comprises switching the second series of frames with the first series of frames so that a recipient previously receiving the second series of frames from the switch instead receives the first series of frames from the switch.

32. The method of claim 29, wherein:
detecting the first particular frame and the second particular frame comprise generating a frame pulse when the start of a frame is detected; and
the method further includes comparing the start of the first particular frame with the start of the second particular frame to determine a time difference between a first frame pulse generated when the start of the first particular frame is detected and a second frame pulse generated when the start of the second particular frame is detected.

33. The method of claim 32 wherein:
the method further comprises determining whether the switch is able to correct the time difference; and
adjusting a phase of one of the first and second particular frames comprises adjusting a phase of one of the first and second particular frames only when the switch is able to correct the time difference.

* * * * *